(12) United States Patent
Horvitz et al.

(10) Patent No.: US 6,901,398 B1
(45) Date of Patent: May 31, 2005

(54) SYSTEM AND METHOD FOR CONSTRUCTING AND PERSONALIZING A UNIVERSAL INFORMATION CLASSIFIER

(75) Inventors: Eric J. Horvitz, Kirkland, WA (US); Andrew W. Jacobs, Seattle, WA (US); Gregory P. Baribault, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 676 days.

(21) Appl. No.: 09/893,941

(22) Filed: Jun. 28, 2001

Related U.S. Application Data

(60) Provisional application No. 60/268,198, filed on Feb. 12, 2001.

(51) Int. Cl.[7] .............................................. G06F 17/30
(52) U.S. Cl. ................................ 707/5; 707/6; 709/206
(58) Field of Search .................... 707/1–6, 10; 709/206

(56) References Cited

U.S. PATENT DOCUMENTS

| | | | | |
|---|---|---|---|---|
| 5,283,856 A | * | 2/1994 | Gross et al. ................... | 706/47 |
| 6,023,723 A | * | 2/2000 | McCormick et al. ........ | 709/206 |
| 6,052,709 A | * | 4/2000 | Paul ............................ | 709/202 |
| 6,161,130 A | * | 12/2000 | Horvitz et al. .............. | 709/206 |
| 6,654,787 B1 | * | 11/2003 | Aronson et al. ............. | 709/206 |

OTHER PUBLICATIONS

Androutsopoulos et al, An Experimental Comparison of Naïve Bayesian and Keyword–Based Anti–Spam Filtering with Persona E–mail Messages, ACM 2000, pp. 160–167.*

Hsu et al, Classification Algorithms for Netnews Articles, ACM 1999, pp. 114–121.*

Rucker, J., et al.; *"Siteseer: Personalized Navigation for the Web"*, Communications of the ACM, vol. 40, No. 3, Mar. 1997, p. 73–75.

Kramer, J., et al.; *"A User–Centered Design Approach to Personalization"*, Communications of the ACM, vol. 43, No. 8, Aug. 1, 2000, p. 45–48.

Gabber, E., et al.; *"Consistent, Yet Anonymous, Web Access with LPWA"*, Communications of the ACM, vol. 42, No. 2, Feb. 1999, p. 42–47.

* cited by examiner

*Primary Examiner*—Greta Robinson
*Assistant Examiner*—Debbie M. Le
(74) *Attorney, Agent, or Firm*—Amin & Turocy, LLP

(57) ABSTRACT

A system and method for personalizing an information classifier is provided. The system includes a default or universal classifier that is pre-trained with features that have relatively universal discriminatory relationships for multiple people and that is operable to produce a measure that a message is classified as having one of several characteristics. The system further includes a second classifier that is constructed and personalized through via a more general search through the space of potentially discriminatory features. The second classifier, after personalization, is intended to classify information at a level exceeding that of the first classifier based on the specific preferences, habits, and desires of the user who personalizes the second classifier. The system further includes a weighting component that facilitates a combining component producing an integrated measure based on input from both the first classifier and the second classifier.

45 Claims, 7 Drawing Sheets

SYSTEM AND METHOD FOR CONSTRUCTING AND PERSONALIZING A UNIVERSAL INFORMATION CLASSIFIER

CROSS-REFERENCE TO RELATED APPLICATIONS

This application claims the benefit of U.S. Provisional Application Ser. No. 60/268,198, entitled SYSTEM AND METHOD FOR PERSONALIZING AN INFORMATION CLASSIFIER and filed on Feb. 12, 2001.

TECHNICAL FIELD

The present invention relates generally to information classification systems and more particularly to personalizing an information classification system (e.g., spam filter, relevance filter, urgency filter).

BACKGROUND OF THE INVENTION

As the volume and variety of information available to information recipients has increased, the ability to filter signal information from noise information in such an ever-expanding volume and variety has become increasingly important. For example, an information recipient may receive one hundred email messages per day, of which ten are urgent, seventy five are regular email messages (not urgent) and fifteen are junk mail ("spam") and thus not urgent. The ability to classify such messages, to produce, for example, a list ordered on urgency, can increase productivity of the information recipient by facilitating prioritizing and focusing on important messages.

Conventionally, static information classifiers have been produced that facilitate classifying information on parameters including, but not limited to, urgency, relevance to task, likelihood of being spam and likelihood of being of interest to an information recipient. But static information classifiers suffer from the problem that one man's garbage is another man's gold. Thus, what may be spam to a first information recipient may be an urgent message to a second information recipient. More generally, different information recipients may have different information receiving goals and priorities, which pre-trained classification systems may not be able to accommodate.

Thus there remains a need for a system and method to improve classification systems to facilitate accounting for personal attributes associated with the information recipient (e.g., preferences, usage patterns, task at hand) and/or individuating attributes of the received information.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention relates to a system and method for personalizing a classifier to account for attributes associated with an information recipient and/or individuating attributes of received information. The classifier to be personalized may be a pre-trained classifier that was constructed using generalized training sets of data. Such training sets may have been collected from a set of homogenous and/or heterogeneous users depending on initial operation desired in the classifier. Such default or "universal" classifiers can be trained to analyze a subset of a larger number of potentially discriminatory features, where the subset of features have the ability to discriminate among categories in a relatively universal manner for different individuals. Thus, classifiers can be based on fewer or more abstract features during training and operation for creating a default filter that is employable by a variety of users, and that can be utilized in a system that allows individuals to build more specialized filters through implicit or explicit training. For example, although a pre-trained, default classifier can be constructed using detailed findings about items being classified, such as multiword phrases and/or single words, more generalized classifiers, designed to be employed by a variety of information recipients may be pre-trained without such specific details. Thus, such detailed features as particular phrases and/or single words remain to be employed in personalizing the pre-trained classifiers.

Such generalized pre-trained classifiers may be trained by considering more universal, or higher level features including, but not limited to, header structure, indicia of junk mail (e.g., percentage non-alphanumeric characters, capitalization patterns), relationships in an organization chart, length of messages, times, dates and other linguistic features like tense usage, presence and number of questions. Such features may typically be more generalizable in their influence on classifier behavior, and thus less sensitive to changing users than more specific features, whose relevance and influence may be more dependent on nuances of different users. When an information recipient receives a personalizable pre-trained classifier, adapting data may be employed in personalizing the pre-trained classifier. Such adapting data may include explicit data provided to the information recipient for the purpose of training the personalizable classifier. For example a set of two hundred sample messages for the information recipient to classify may be provided, with the classifications performed by the information recipient being employed to modify the generalized pre-trained classifier and/or to produce a new, personalized classifier. The adapting data may additionally and/or alternatively include data gathered by observing user behavior in working with received information. By way of illustration, the classifier being trained may receive a message, and then may take actions including, but not limited to, immediately looking at the message and responding to it, immediately looking at the message and archiving it, immediately looking at the message and discarding it, and letting it sit in an in-box for a period of time. Such actions, and other data gathered by observing the data (collectively the "action data"), may be compared to a classification prediction made by the classifier with the relationship between the observed action and the prediction being employed to update the classifier being personalized.

The adapting data may be employed to personalize a classifier in manners including, but not limited to, updating the pre-trained classifier and/or producing a new, separate classifier. When information to be processed by the classifier being personalized is received, such information may be processed by the original pre-trained classifier, the personalized classifier being constructed, and/or a combination of the pre-trained classifier and the classifier being personalized. When combined processing is undertaken, the weight to be associated with classifying processing performed by the pre-trained classifier and/or the classifier being personalized may be adjusted based on factors including, but not limited to, the stage to which the personalization of the classifier has progressed and the breadth of classifying features encountered in the adapting data. By way of illustration, a threshold amount of adapting data may be considered necessary to provide a confidence level in classifications made by the personalized classifier. Thus, the weight accorded to classifications made by the personalized classifier will be increased as the amount and/or quality of adapting data employed in personalizing the classifier increases. After the threshold amount of adapting data has been employed in personalizing the classifier, the classification of subsequently received information may be performed by the personalized classifier, with the original classifier taking a substantially insignificant role.

The classifiers can include, but are not limited to classifiers constructed using techniques known in the art like support vector methodologies, Bayesian processing (e.g., naïve Bayesian, sophisticated Bayesian), similarity analysis (e.g., employing dot product and/or cosine function processing) and decision trees. Such classifiers may classify information on different levels. By way of illustration, a first classifier may be a document classifier, while a second classifier may be a document classifier employing text and feature analysis.

The personalization process may progress in a desired manner, but there can be situations where the personalization process may not progress in a desired manner. Thus, the present invention provides a method, via the inclusion of temporal data associated with updates to the classifier being personalized, to back out of the personalization, returning the classifier to an earlier state (e.g., its original state). Such temporal data also facilitates personalizing a filter for different periods of time. For example, during a first period of time, an information recipient may have been performing a first type of processing and receiving a first type of information, that lead to a first personalization of the filter but during a second period of time, the information recipient may have been performing a second type of processing and receiving a second type of information that lead to a second type of personalization. Temporal data associated with such time sensitive personalization can include, but is not limited to, fields that hold information concerning the creation date of an item, fields that hold information concerning the receipt data of an item, fields that hold information concerning a time before which an item is or is not to be considered and fields that hold information concerning a time after which an item is or is not to be considered.

An information recipient employing a classifier that is personalizable may desire information concerning the personalization process, and may further desire to have some input into the personalization process. Thus, the present invention provides a user interface operable to perform actions including, but not limited to, outputting information concerning the degree to which the personalization process has progressed (e.g. 75% personalized), inputting information concerning the desired size of the adapting data set to be employed in determining the relative weighting of classifications from the pre-trained classifier and the classifier being personalized (e.g., sliding control for adapting data set size between 100 and 1000 messages), inputting information concerning the period of time for which personalizing adapting data should be employed (e.g., calendar control for specifying training times to include/exclude) and inputting information concerning a point in time to which the information recipient would like to reset the classifier (e.g., sliding control employed to remove 50 to 5000 messages from adapting data set to force retraining).

As personalization progresses, information more recently employed to personalize the classifier may be more relevant than information less recently employed to personalize the classifier. Thus, the present invention provides for aging out information, and/or the influence of such information, from the classifier. By way of illustration, if five hundred messages are required to be observed before results from a personalized classifier are considered valid, then once five hundred messages have been received, recently received messages may cause messages received at an earlier point in time to be removed from the adapting data set. Such "aging out" may be performed by methods including, but not limited to, physical removal and removal by weighting factor. Physical removal may involve deleting a record from a data store associated with the classifier while removal by weighting factor may involve applying a formula to a data record, where the relevance of the data record is modeled by a weighting factor, with data records that are older receiving reduced weighting factors, potentially down to a weighting factor that substantially removes the data record from a classification decision. The weighting factor can vary based, at least in part, on the age of an item being considered. For example, as a document and/or set of documents age, the weighting factor applied to such documents may decrease and in one example of the present invention, may decrease to a point (e.g., 0%), where the document and/or set of documents are no longer considered. However, a user may desire to override such aging, and thus, in one example of the present invention, the user may configure the present invention to prevent the "aging out by reduced weighting factor" of a document and/or set of documents.

One aspect of the present invention provides a system for personalizing an information classifier. The system includes a first classifier that is pre-trained with training data and that is operable to produce a first measure related to a message being classified as having one or more characteristics. The characteristics may be, for example, a probability that a message is of a known type, a message priority, an urgency score, a computed expected urgency in an email prioritization system and the like. The system also includes a second classifier that is trained with adapting data and that is operable to produce a second measure related to the message being classified as having one or more characteristics. The system further includes a weighting component that is adapted to assign a first weight to the first measure and a second weight to the second measure so that a combining component can combine the first measure and the second measure to produce a third measure associated with the message being classified as having one or more characteristics. The combining component can perform the combination of the measures based, at least in part, on the first weight and the second weight. The system further includes an aging component adapted to modify the relevance of one or more messages based, at least in part, on time-based information associated with a message and an adapting component operable to modify the second classifier so that the second classifier becomes more personalized than the first classifier. The system further includes a user interface that is operable to display information concerning the personalization of the second classifier and to accept information concerning retraining the second classifier.

Another aspect of the present invention provides a method for personalizing an information classifying process. The method includes receiving a message to be classified and producing a first measure concerning the classification of the message, where the measure may be, for example, a probability that the message is of a known type, a message priority, an urgency score, a computed expected urgency in an email prioritization system and the like. The method then includes producing a second measure concerning the nature or classification of the message. Once the two measures have been produced, the first measure is combined with the second measure to produce a third measure associated with the classification of the message. The third measure can be produced by applying a first weight to the first measure and a second weight to the second measure. Such measures can be combined, for example, by a function $F=(1-w)m_1+w(m_2)$, where w is a weighting value that may vary over time, $m_1$ is the first measure and $m_2$ is the second measure. The use of this form of the weighting equation leads to outputs that have the same range as the two input measures. The method further includes updating data stores, data structures, algorithms, processes, threads and/or rules employed in generating the second measure. The updating may be based, for example, on a relationship between the first measure and the second measure with the updating being employed to personalize the generation of the second classifier.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION

Figure 1:
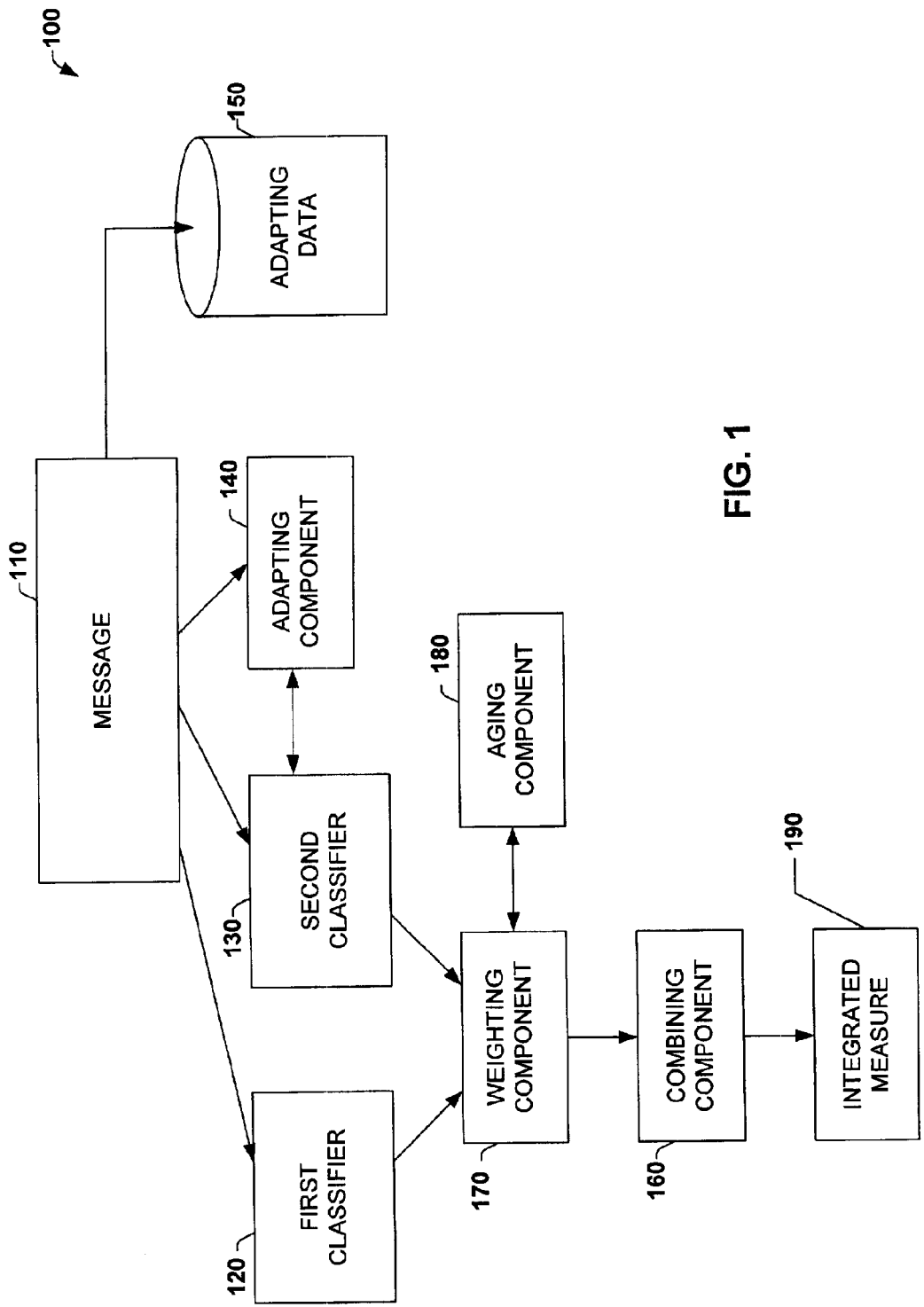
FIG. 1 is a schematic block diagram illustrating a system for personalizing an information classifier, in accordance with an aspect of the present invention.

The present invention is now described with reference to the drawings, where like reference numerals are used to refer to like elements throughout. In the following description, for purposes of explanation, numerous specific details are set forth in order to provide a thorough understanding of the present invention. It may be evident, however that the present invention may be practiced without these specific details. In other instances, well-known structures and devices are shown in block diagram form in order to facilitate description of the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program and a computer. By way of illustration, both an application running on a server and the server can be components. One or more components may reside within a process, and/or thread of execution and a component may be localized on one computer and/or distributed between two or more computers.

As used in this application, the term "message" is intended to refer to an information communication. The message may be, for example, an email message, a web page, a file, or other identifiable sets of information.

It is to be appreciated that various aspects of the present invention may employ technologies associated with facilitating unconstrained optimization and/or minimization of error costs. Thus, non-linear training systems/methodologies (e.g., back propagation, Bayesian learning, linear regression, non-linear regression, or other neural networking paradigms including mixture of experts, radial basis functions, and other statistical or logical inference methods) may be employed.

Referring initially to FIG. 1, a schematic block diagram illustrates a system 100 for personalizing an information classifier. The system 100 receives a message 110. The message 110 may arrive from and/or be stored in a data store 150 that holds adapting data. The message 110 may be, for example, an email message, a web page, and/or other information containing messages. A first classifier 120 processes the message 110 to produce a first probability that the message 110 can be classified in a certain way. By way of illustration, an arriving message 110 may be classified according to whether it is urgent or not urgent. By way of further illustration, an arriving message 110 may be classified according to whether the message 110 is junk mail ("spam"). While the previous two examples refer to binary classifications, it is to be appreciated that the first classifier 120 can produce measures associated with higher degree classifications (e.g., a message priority). The first classifier 120 can be a pre-trained classifier that was constructed using one or more training sets of data that were collected from one or more homogenous and/or heterogeneous users depending on the initial operation desired in the first classifier 120. Although the pre-trained classifier could have been constructed using fine-grained data including detailed phrases and/or single words, producing a more generalized classifier that can produce adequate results for a variety of information recipients may be accomplished using data that has features that have relatively universal discriminatory relationships for multiple people. Thus, the fine-grained data (e.g., detailed phrases and/or single words) may be employed in personalizing the pre-trained classifiers and/or in producing a new, more personalized classifier. The first classifier 120, as a more generalized information classifier, thus may have been trained by considering higher level features including, but not limited to, header structure, indicia of junk mail (e.g., percentage non-alphanumeric characters, capitalization patterns), relationships in an organization chart, length of messages, times, dates and other linguistic features like tense usage, presence and number of questions.

The first classifier 120 may process the message 110 using techniques including, but not limited to techniques known in the art like support vector methodologies, Bayesian processing (e.g., naïve Bayesian, sophisticated Bayesian), similarity analysis (e.g., employing dot product and/or cosine function processing) and decision trees. The first classifier 120 may classify information on different levels. By way of illustration, a first classifier may be a document classifier, while a second classifier may be a document classifier employing text and feature analysis.

The first classifier 120 may store the message 110 and/or information concerning the message 110 in a data store 150 associated with the first classifying component. The data store may be, for example, a database, a table, an array, a list, a file, a queue and a data cube. Storing the message 110 and/or information concerning the message 110 facilitates evaluating how a probability was calculated, facilitates adapting (e.g., personalizing) an information classifier and facilitates specifying periods of time that may be relevant to adapting an information classifier. Concerning such time periods, the stored information may include temporal data that can be employed in computing the relevance of an aging item. By way of illustration and not limitation, as an item (e.g., a document) ages, its relevance to the personalization of a filter may decrease. Thus, the data store 150 can include fields that hold information concerning the creation date of an item, fields that hold information concerning the receipt data of an item, fields that hold information concerning times before which an item is or is not to be considered and fields that hold information concerning times after which an item is or is not to be considered.

The system 100 also includes a second classifier 130. The second classifier 130 processes the message 110 to produce a second measure associated with the message 110 being classified in a certain way. It is to be appreciated that the second classifier 130 can produce measures including, but not limited to, measures associated with a message priority, measures associated with the classification of a message as a known type, a measure associated with an urgency score, and a measure associated with a computed expected urgency in an email prioritization system and the like. Although the second classifier 130 and the first classifier 120 are illustrated as separate components, it is to be appreciated that the first classifier 120 and the second classifier 130 may reside in the same computing system and/or processing system, and may access similar and/or related data stores and/or structures. In one example of the present invention, where the first classifier 120 and the second classifier 130 are distributed between two or more communicating processes, the present invention may employ a data packet that is transmitted between the two or more computer processes. The data packet may include information related to personalizing an information classifier where the information includes, but is not limited to, weighting data, aging data and adapting data.

Concerning the classifications produced by the classifying components, the arriving message 110 may be classified according to its urgency. By way of further illustration, the arriving message 110 may be classified according to whether the message 110 is junk mail ("spam"). While the previous two examples refer to binary classifications, it is to be appreciated that the second classifier 130 can produce measures associated with higher degree classifications (e.g., very urgent, somewhat urgent, not urgent, to be completely ignored) and other characteristics (e.g., message priority, urgency score, computed expected urgency in an email prioritization system).

The second classifier 130 may process the message 110 using techniques including, but not limited to techniques known in the art like support vector methodologies, Bayesian processing (e.g., naïve Bayesian), similarity analysis (e.g., employing dot product and/or cosine function processing) and decision trees. The second classifier 130 may also store the message 110 and/or information concerning the message 110 (e.g., temporal data, source data) in a data store associated with the second classifier. The data store may be, for example, a database, a table, an array, a list, a file, a queue and a data cube. Storing the message 110 and/or information concerning the message 110 facilitates evaluating how a probability was calculated, facilitates adapting (e.g., personalizing) the second classifier 130 and facilitates specifying periods of time that may be relevant in adapting the second classifier 130.

In one exemplary aspect of the present invention, the second classifier 130 may be constructed by adapting the first classifier 120. By way of illustration, one or more data stores, data structures, processes, threads, algorithms and rules associated with the first classifier 120 may be updated to reflect personalization associated with the second classifier 130. Alternatively, and/or additionally, one or more new data stores, data structures, processes, threads, algorithms and rules, may be created and associated with the second classifier 130. The second classifier 130, whether a stand alone information classifier or an extension and/or modification of the first classifier 120 is adapted to provide more personalized classification of messages. By way of illustration, a programmer may be employed in a group working on a compiler project. Thus, the programmer may receive a higher proportion of messages dealing with compiler issues, and may receive a higher proportion of messages from a certain group of individuals. These types of messages may be deemed to be more urgent for the programmer. Both the project and the group of individuals may employ specialized and/or localized language and/or semantic methods that are recognizable by a classifier trained with such fine-grained data. Thus, a generalized classifier may benefit from training that employs the specialized and/or localized language and/or semantic methods. Thus, a determination of what messages are urgent may be based, at least in part, on the unique qualities embodied in fine-grained data associated with the compiler project.

Subsequently, the programmer may be transferred to a different group working on a user interface project. Thus, the classifier that was personalized during the compiler project may benefit from retraining through exposure to the specialized language and/or semantic methods employed on the new project and by the new group of information generators. The second classifier 130 may thus be retrained to minimize the personalization achieved during the compiler project and to maximize the personalization achieved during the user interface project.

To achieve such personalization, the second classifier 130 may be presented with messages from a data store 150 holding adapting data and an adapting component 140 may update one or more data stores, data structures, processes, threads, algorithms and rules, for example. Updating the one or more data stores, data structures, processes, threads, algorithms and rules can alter the classification probabilities produced by the second classifier 130, which facilitates personalizing the second classifier 130.

The data store 150 may include explicit data provided to user of the second classifier 130 for the purpose of training the personalizable classifier. By way of illustration, the user of the second classifier 130 may receive a set of two hundred messages that the user may classify by hand, with the user's classifications employed to adapt the second classifier 130. The data store 150 may additionally and/or alternatively include data gathered by observing user behavior in working with received information. By way of illustration, the second classifier 130 may receive the message 110 and make a prediction concerning the classification of the message 130. Such a prediction may then be compared to user actions including, but not limited to, immediately looking at the message and responding to it, immediately looking at the message and archiving it, immediately looking at the message and discarding it, and letting it sit in an in-box for a period of time. Such actions, and other data gathered by observing the recipient of the message 110 may be compared to the classification prediction made by the second classifier 130 with the relationship between the observed action and the prediction being employed to update the second classifier 130. By way of illustration, if the predicted measure matches the observed action then one or more parameters, data stores, data structures, processes, threads, algorithms and rules, for example, may be updated to reinforce the decision making process that produced the matching measure. But if the predicted measure does not match the observed action, then one or more parameters, data stores, data structures, processes, threads, algorithms and rules, for example, may be updated to de-emphasize the decision making process that produced the non-matching measure.

The system 100 includes a weighting component 170 that can accept a first measure produced by the first classifier 120 and assign a first weight to that first measure. Similarly, the weighting component 170 can accept a second measure produced by the second classifier 130 and assign a second weight to that second measure. A combining component 160 can take the first measure produced by the first classifier 120, the first weight assigned to the first measure, the second measure produced by the second classifier 130 and the second weight assigned to the second measure and produce an integrated measure 190 based, at least in part, on the two measures and the two weights. In one exemplary aspect of the present invention, the sum of the first and second weights will equal one. Thus, an example equation employed to produce the integrated measure 190 may resemble:

$$CP_{190}=(p1*w2)+(p2*(1-w2)).$$

Where $CP_{190}$ is the integrated measure, p1 is a first measure produced by the first classifier 120, w1 is the first weight assigned to the first measure, p2 is the second measure produced by the second classifier 130 and w2 is the second weight assigned to the second measure. In one example of the present invention, the two measures being combined may be, for example, a score produced by a default filter and a score produced by a personalized filter. Thus, the first measure may be an urgency score computed by using a default filter and the second measure may be an urgency score computed by using a personalized filter. In one example of the present invention, the integrated measure $CP_{190}$ may be normalized to a range substantially similar to the range(s) associated with the measures being integrated.

The weights may be determined based, for example, on the degree to which the second classifier 130 has been personalized. By way of illustration, at the point in time when the second classifier 130 receives its first adapting data message, there may be a very low confidence that the measure produced by the second classifier 130 is valid. Thus, the second weight associated with the measure produced by the second classifier 130 may be very low while the first weight associated with the measure produced by the first classifier 120 may be very high, and thus the integrated measure 190 will depend, to a much greater degree, on the measure produced by the first classifier 120. By way of further illustration, at a later point in time, when the second classifier 130 has received half of the amount of messages deemed necessary to produce a valid measure, there may still be a low confidence in the measure produced by the second classifier, but that measure may have some validity. Thus, the second weight associated with the measure produced by the second classifier 130 may be increased slightly while the first weight associated with the measure produced by the first classifier 120 may be decreased slightly, leaving the integrated measure 190 still substantially dominated by the measure produced by the first classifier 120. By way of still further illustration, at a still later point in time, when the second classifier 130 has received more than the amount of messages deemed necessary to produce a valid measure, there may be a high confidence in the measure produced by the second classifier 130. Thus, the second weight associated with the measure produced by the second classifier 130 may be increased to a point where it substantially dominates the integrated measure 190 produced by the combining component 160 and the first weight associated with the measure produced by the first classifier 120 may be decreased to a point where it plays substantially no part in the integrated measure 190 produced by the combining component 160. Thus, while the second classifier 130 is being personalized, the measure associated with classifying the message 110 may be influenced to varying degrees by the first classifier 120, that was pre-trained with general, coarse-grained information (e.g., information with features that have relatively universal discriminatory relationships for multiple people), and by the second classifier 130, that is being trained with more specific, finer-grained information.

The system 100 also includes an aging component 180 that can be employed to affect the relevance of data employed in calculating measures by the first classifier 120 and/or the second classifier 130. In one exemplary aspect of the present invention, the aging component 180 may achieve such relevance altering effects by manipulating one or more weights assigned and/or employed by the weighting component 170. It is to be appreciated that the aging component 180 may also achieve such relevance altering effects by manipulating items including, but not limited to, one or more data stores, data structures, processes, threads, algorithms and rules associated with the first classifier 120 and/or the second classifier 130. By way of illustration, the aging component 180 may examine a weight assigned by the weighting component 170 and determine that the information employed to produce the generated weight is from a time period that indicates that its relevance should be decreased as compared to data from a more relevant time period. In a simple example, older data may be replaced by newer data. In a more complicated example, referring to the programmer who first worked on a compiler project and then worked on a user interface project, the relevance of messages received since the job change may be more relevant to training the second classifier 130 and/or to producing the integrated measure 190, and thus the weight associated with the measure produced by the second classifier 130 may be updated, and the adapting component 140 may vary its updating processes based on the relevance of the message. But if the programmer subsequently returns to the compiler project, then the relevant time period may similarly be returned to personalization achieved during the programmer's first iteration on the compiler project.

The personalization process applied to the second classifier 130 may progress in a desired manner, but there can be situations where the personalization process may not progress in a desired manner. Thus, the present invention provides, in one example of the present invention, via the inclusion of temporal data associated with updates to the classifier being personalized, for rescinding the personalization. The result of such rescinding is that the second classifier 130 and/or one or more data stores, data structures, processes, threads, algorithms and/or rules associated with the second classifier 130 are returned to an earlier state (e.g., its original state). Such temporal data also facilitates producing an information classifier that is personalized based on different periods of time. For example, a user of the second classifier 130 may experience a different environment and thus be exposed to different types of messages that have different classifications during different periods of time. By way of illustration, an attorney may receive primarily law-related messages at work, but may receive primarily personal messages at home. Training performed during the different periods of time may have different affects on the second classifier 130. Thus, the attorney may desire different information classifying based on the different periods of time during which information is received. By way of further illustration, a contract nurse may be employed in a first hospital for a first period of three months, and be exposed to messages associated with that hospital during that time, while the contract nurse may be employed in a second hospital for a second period of six months and be exposed to messages associated with the second hospital during that time. Thus, training performed during the two periods of time may affect the second classifier 130 in different ways. More generally, during a first period of time, an information recipient may be exposed to a first environment and receive a first type of information that leads to a first personalization of the information classifier. But during one or more second periods of time the information recipient may be exposed to one or more second environments and receive one or more second types of information that lead to one or more second types of personalization. The inclusion of temporal data facilitates specifying periods of time for which the user of the second classifier 130 desires personalization that was performed to be employed in calculating a measure.

Thus, by facilitating training an information classifier to produce information classifications based on finer-grained data associated with attributes more personal to the user of the information classifier, accuracy improvements over conventional information classification systems are achieved. Further, by facilitating retraining, and by facilitating specifying relevant periods of time, the present invention provides flexibility improvements over conventional systems.

Figure 2:
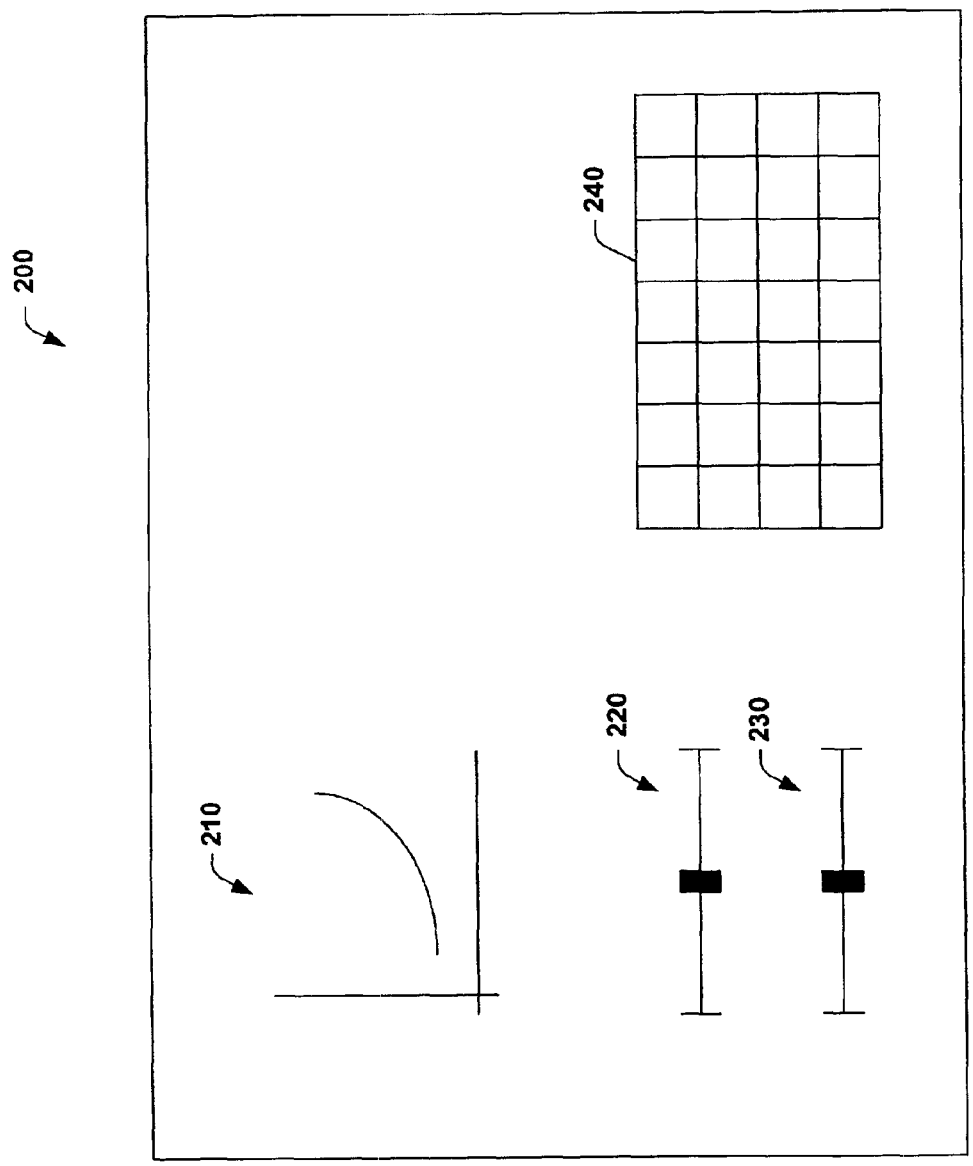
FIG. 2 is a simulated screen shot of a user interface employed with an aspect of the present invention.

Referring now to FIG. 2, a simulated screen shot 200 illustrates user interface elements that may be employed to support various aspects of the present invention. Such user interface elements may be employed because an information recipient employing a personalizable information classifier may desire information concerning the personalization process, and may further desire to have some input into the personalization process. For example, a user may desire to know to what degree the information classifier has been personalized, how many messages are required to personalize the information classifier and what periods of time are being employed in calculating probabilities. Thus, the screen shot 200 illustrates a user interface graph element 210 that can be employed to output information concerning the degree to which the personalization process has progressed (e.g., 75% personalized). While a line graph is illustrated, it is to be appreciated that other graphs (e.g., bar graphs, pie charts) and other display elements may be employed in the present invention.

The screen shot 200 further illustrates a user interface slider element 220 that can be employed to display information concerning the size of the adapting data set to be employed in determining the relative weighting of classifications from the pre-trained classifier and the classifier being personalized (e.g., sliding control for adapting data set size between 100 and 1000 messages) and which may alternatively and/or additionally be employed to input information employed in controlling the size of the adapting data set to be employed in determining the relative weightings. For example, the slider element 220 may be positioned to indicate that the adapting data set size is currently three hundred and fifty messages and then a user of the information classifier being personalized may reposition the slider to indicate that the data set size should be increased to five hundred messages.

The screen shot 200 further illustrates a user interface sliding element 230 that may be employed to display information concerning how many messages are available to be removed to force retraining and for inputting information concerning how many messages are to be removed and/or de-emphasized to force retraining of the information classifier. By way of illustration, the slider element 230 may be positioned to indicate that one hundred messages may be removed before a confidence associated with a measure will be effected. A user of the personalized classifier may then reposition the slider to indicate that five hundred messages should be removed, which may force the classifier to begin retraining, and which may affect the confidence associated with a measure produced by the information classifier being retrained. Although user interface elements 220 and 230 are illustrated as sliders, it is to be appreciated that other user interface elements (e.g., dials, buttons, text input areas, speech input/output elements) may be employed with the present invention. The inclusion of user interface elements 220 and 230 provide for ease of use improvements over conventional systems.

The screen shot 200 also illustrates a user interface calendar element 240 that can be employed to display information concerning the period of time for which personalization is being employed in computing measures. The calendar element 240 can also be employed to input data indicating one or more periods of time for which personalization should be employed in computing measures. For example, a user of the calendar element 240 may be able to specify that personalization occurring during a certain three week period of time is to be emphasized while personalization occurring during a certain two week period of time is to be de-emphasized. Thus, improvements in flexibility over conventional systems are achieved.

As one application of the user interface elements illustrated in screen shot 200, consider that as personalization progresses, information more recently employed to personalize the classifier may be more relevant than information less recently employed to personalize the classifier. Thus, the present invention provides for aging out information, and/or the influence of such information, from the classifier. By way of illustration, if five hundred messages are required to be observed before results from a personalized classifier are considered valid, then once five hundred messages have been received, recently received messages may cause messages received at an earlier point in time to be removed from the adapting data set. Such "aging out" may be performed by methods including, but not limited to, physical removal and removal by weighting factor. Physical removal may involve deleting a record from a data store associated with the classifier while removal by weighting factor may involve applying a formula to a data record, where the relevance of the data record is modeled by a weighting factor, with data records that are older receiving reduced weighting factors, potentially down to a weighting factor that substantially removes the data record from a classification decision. The user interface elements included on screen shot 200 facilitate understanding the degree to which such personalization has progressed, and provide mechanisms for controlling the rate at which personalization will occur (by controlling the size of the required adapting data set before confidence is achieved), the points in time at which retraining will occur (by rescinding the affect of messages) and the periods of time for which training will be relevant (by specifying emphasize/de-emphasize time periods). Thus, improvements in flexibility, ease of use, and accuracy over conventional systems are achieved. Such temporal based processing is facilitated by storing information concerning the age of an item. Furthermore, information including, but not limited to, the creation date of an item, the receipt data of an object, dates before which an item is or is not to be considered and dates after which an item is or is not to be considered can be stored to facilitate such temporal processing.

Figure 3:
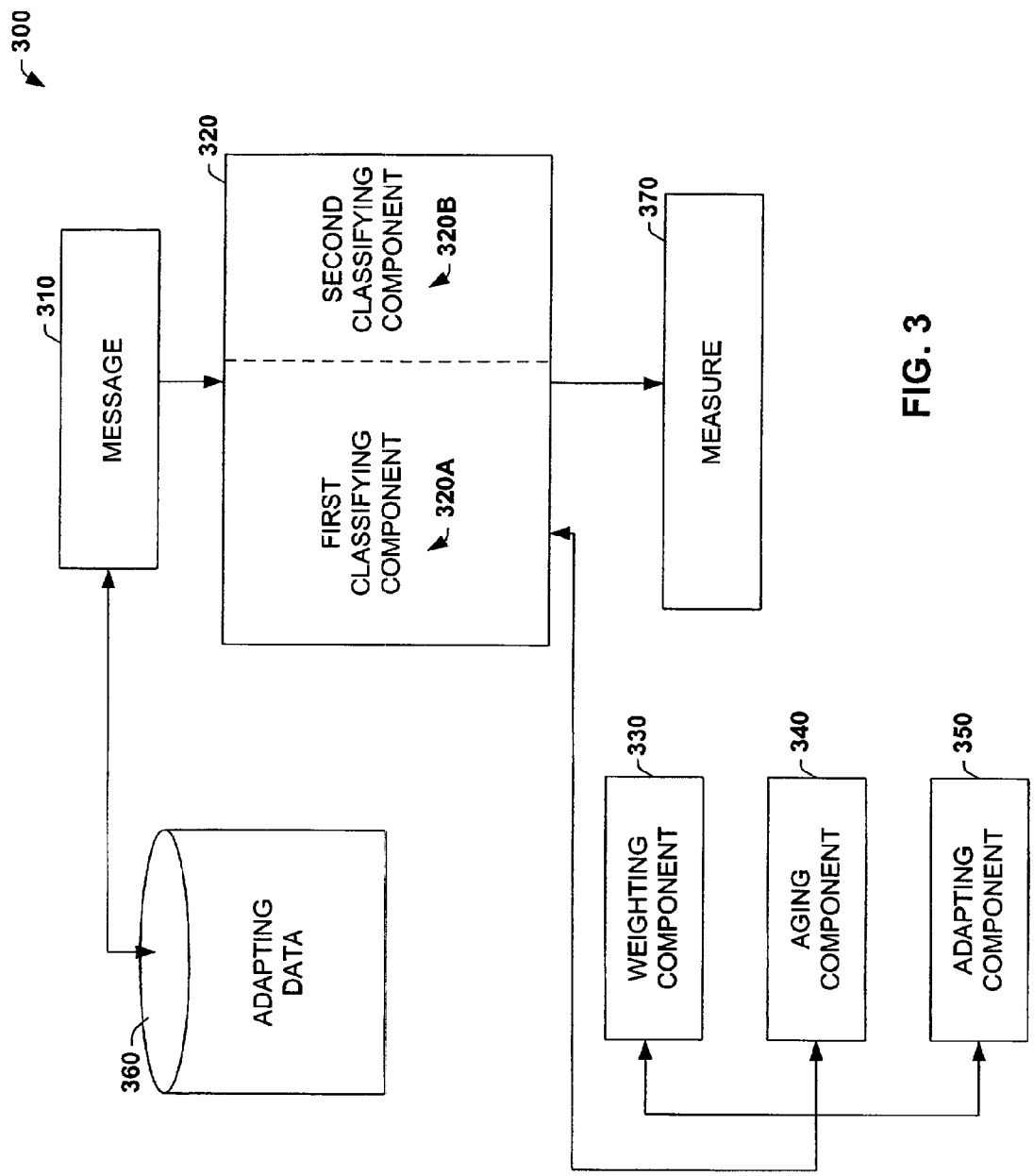
FIG. 3 is a schematic block diagram illustrating an information classifier where a first classifying component and a second classifying component reside in the same component, in accordance with an aspect of the present invention.

Referring now to FIG. 3, a system 300 for personalizing an information classifier is illustrated. The system 300 includes an information classifier 320 that includes both a first classifying component 320A and a second classifying component 320B residing in the same classifier 320. The system 300 receives a message 310 that may come from a data store 360 holding adapting data and/or the message 310 may come from an external source and be written to the data store 360. The information classifier 320 produces a measure 370 that the message 310 can be classified in a certain way. By way of illustration, the information classifier 320 may produce a measure related to a message being relevant to a task in which an information recipient is currently engaged, which may be employed to determine whether to interrupt the recipient with the message, for example. By way of further illustration, the measure 370 can be employed in decisions including, but not limited to, how to route information, when to send information, when to choose a modality for a communication, when to backup information, when to encrypt information, and the like.

The information classifier 320 may initially function as a generalized information classifier and may, over time, be adapted to function as a more personalized information classifier, that takes into account the preferences, habits and unique characteristics of an information, recipient and characteristics associated with information sent to an information, recipient. Thus, the information classifier 320 may rely on previous knowledge employed to train the information classifier 320 to function as a general classifier and may also rely on subsequent knowledge employed to train the information classifier 320 to function as a personalized information classifier. A division between the previous knowledge and the subsequent knowledge may be achieved, for example, by having the first classifying component 320A process the previous knowledge and by having the second classifying component 320B process the subsequent knowledge. Although the processing may be divided between the first classifying component 320A and the second classifying component 320B, it is to be appreciated that both classifying components may access similar and/or identical data stores, data structures, processes, threads, algorithms and rules, for example, to process the previous and subsequent knowledge. It is to be further appreciated that the previous knowledge and the subsequent knowledge may be stored in similar and/or identical data stores, data structures, processes, threads, algorithms and rules, for example. It is to be even further appreciated that although two classifying components 320A and 320B are illustrated, that a greater and/or lesser number classifying components may be employed in accordance with the present invention.

Processing performed by the information classifier 320 may be affected by inputs from a weighting component 330, an aging component 340 and an adapting component 350. By way of illustration, the weighting component 330 may determine that processing performed by the first classifying component 320A is more relevant to a particular information classification than processing performed by the second classifying component 320B, and thus may more heavily weight the processing performed by the first classifying component 320A so that the measure 370 is more heavily influenced by the first classifying component 320A.

By way of further illustration, the aging component 340 may determine that information employed in determining the measure 370 has reached an age where it should be gradually de-emphasized in further probability processing. Thus, the aging component 340 may update one or more data stores, data structures, processes, threads, algorithms and rules associated with the information classifier 320 to alter how the measure 370 is produced. In a simple example, older data may have its relevance reduced as compared to newer data. In a more complicated example, data that is unique may have its relevance increased as compared to repetitive data.

By way of still further illustration, the adapting component 350 may determine that processing performed by the information classifier 320 can be adapted to produce a different degree of personalization. For example, a user may indicate that retraining should occur, and thus the adapting component 350 may update one or more data stores, data structures, processes, threads, algorithms and rules to rescind personalization applied to the information classifier 320. Conversely, a user may indicate that no more personalization should occur, and thus the adapting component 350 may update data stores, data structures, processes, threads, algorithms and rules to prevent further personalization. Furthermore, a user may determine that personalization that occurred during a first period of time should be enhanced while personalization that occurred during a second period of time should be de-emphasized, and thus the adapting component 350 may update data stores, data structures, processes, threads, algorithms and rules to account for the user preferences. Since the information classifier 320 may employ techniques known in the art like support vector methodology, naïve Bayesian processing methodology, sophisticated Bayesian processing methodology, similarity analysis employing dot product and/or cosine function processing and decision tree processing, it is to be appreciated that updating the one or more data stores, data structures, processes, threads, algorithms and rules may vary based on the information classification technique(s) employed by the information classifier 320.

Figure 4:
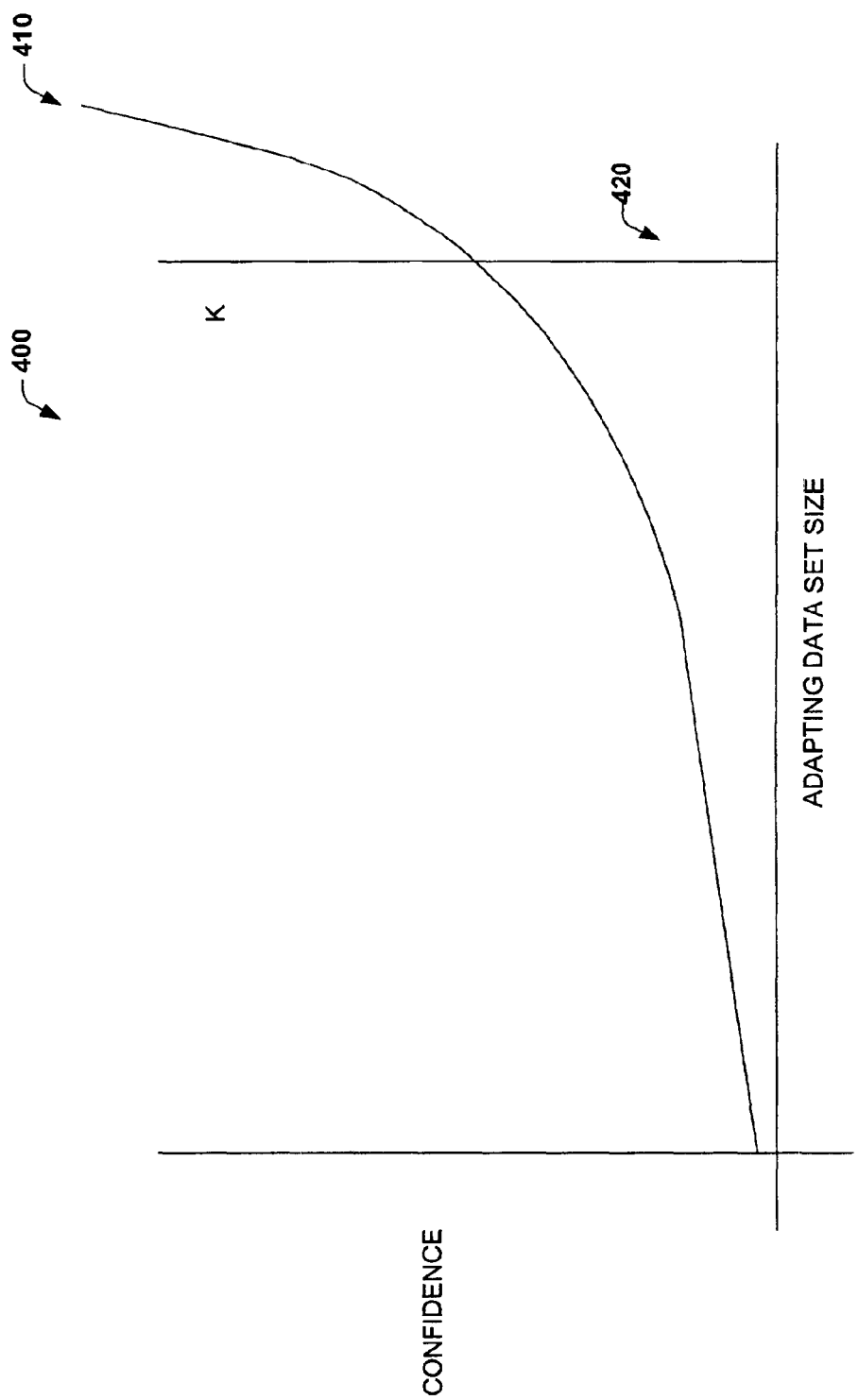
FIG. 4 is a graph illustrating the progression of the personalization of an information classifier, in accordance with an aspect of the present invention.

Turning now to FIG. 4, a graph 400 illustrates the progression of the personalization of an information classifier. The x axis of the graph 400 represents the amount of adapting data that has been employed to personalize the information classifier. The y axis of the graph 400 represents a confidence level that can be associated with the measure produced by the information classifier being personalized. A curve 410 is illustrated rising from an initial zero level and increasing in relationship to the amount of data employed to personalize the information classifier. A certain amount of data K is represented by the vertical line 420. At the point in time when the curve 410 crosses the line 420, an acceptable confidence level associated with the measure produced by the information classifier may be achieved. The present invention allows a user of an information classifier to manipulate K so that line 420 may be moved to the left or the right on the x axis of graph 400. Thus, the present invention provides flexibility gains over conventional systems. By way of illustration, a first user of an information classifier may determine that the generalized information classifier provides acceptable results, and thus a low value for K may be established, reducing the training time for the information classifier being trained. But a second user of an information classifier may determine that the generalized information classifier requires extensive training before acceptable personalized results are achieved, and thus a high value for K may be established.

It is to be appreciated that although graph 410 illustrates a relationship between the size of the adapting data set, that other relationships may also be employed to affect the personalizing of an information classifier. For example, in another relationship, the x axis of the graph 400 may represent the coverage of experienced adapting data, where coverage relates to how many of a pre-determined set of features have been experienced in the adapting data set. The coverage may relate, for example, to the presence or absence of one or more predetermined linguistic features in the adapting data. By way of illustration, an adapting data set that is substantially homogenous may not provide a sufficient variety between linguistic features to partition the adapting data into sets that can be employed to classify a message. If substantially all the adapting data received is the same, it may be meaningless to distinguish between such messages, or distinctions may be made on inappropriate features. Thus, the coverage of the adapting data set may be low, and the confidence in probabilities associated with the adapting data set may similarly be low. Conversely, if an adapting data set that is rich in variety between linguistic, structural and/or semantic features is presented to an information classifier being personalized, then the coverage may be high and the confidence in a measure produced by an information classifier exposed to such high coverage data set may be correspondingly higher.

Figure 5:
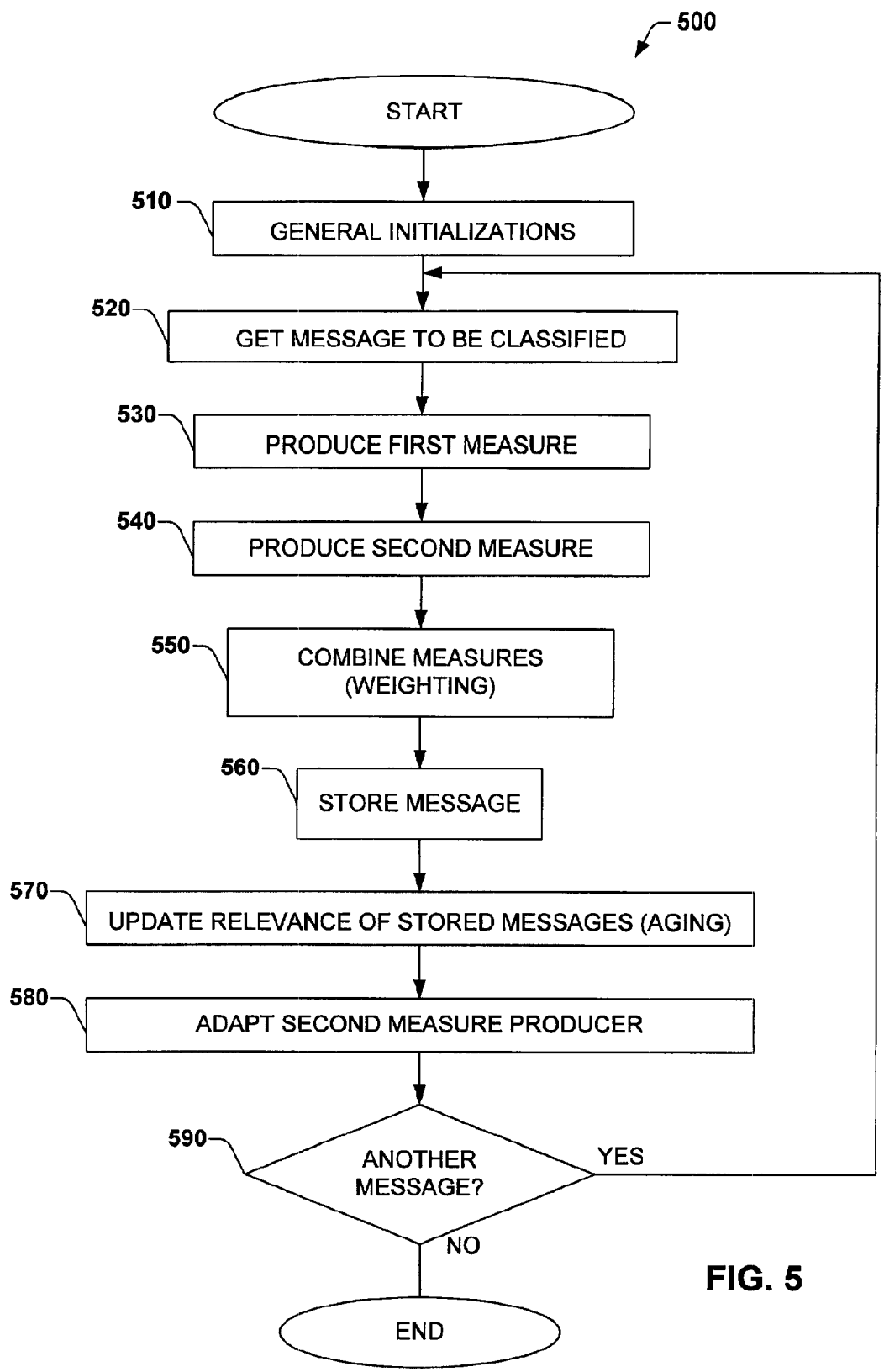
FIG. 5 is a flow chart illustrating one particular methodology for carrying out an aspect of the present invention.
Figure 6:
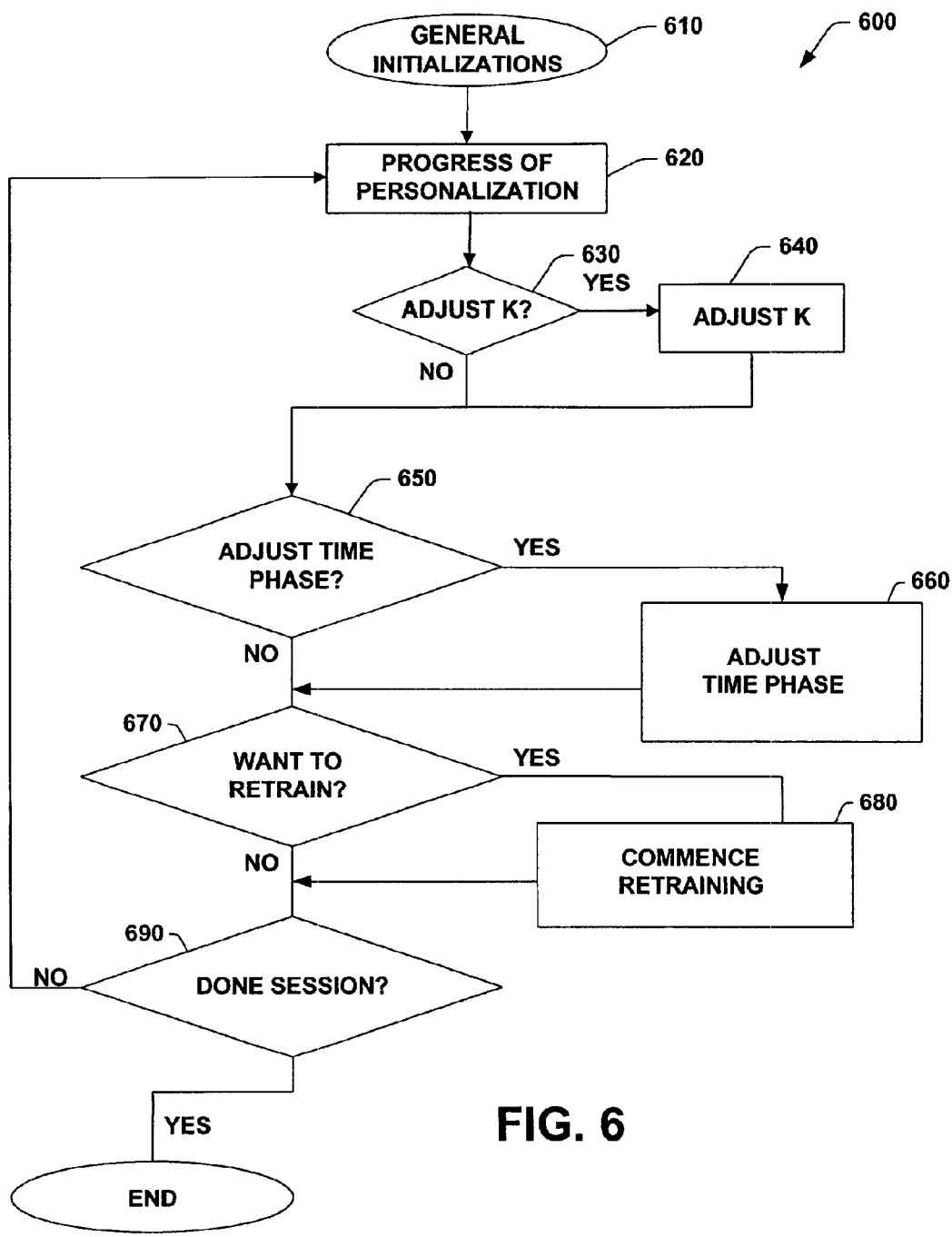
FIG. 6 is a flow chart illustrating another methodology for carrying out an aspect of the present invention.

In view of the exemplary systems shown and described above, methodologies, which may be implemented in accordance with the present invention will be better appreciated with reference to the flow diagrams of FIGS. 5 and 6. While for purposes of simplicity of explanation, the illustrated methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention. Further, additional and/or alternative methodologies may employ additional blocks, not illustrated herein.

The invention may be described in the general context of computer-executable instructions such as program modules, executed by one or more components. Generally, program modules include routines, programs, objects, data structures, etc. that perform particular tasks or implement particular abstract data types. Typically the functionality of the program modules can be combined or distributed as desired in various embodiments. Furthermore, computer executable instructions operable to perform the methods described herein can be stored on computer readable media.

Turning now to FIG. 5, a flow chart illustrates a method 500 for personalizing an information classifier. At 510, general initializations occur. Such initializations can include, but are not limited to, allocating memory, establishing pointers, establishing data communications, acquiring resources, setting variables and displaying process activity. At 520, a message to be classified is received. The message may arrive, for example, from an adapting data set, which may include both explicit messages and observed messages or from an external source. At 530, a first measure associated with the message of 520 is produced. The first measure may be produced by techniques including, but not limited to, support vector methodology, a naïve Bayesian processing methodology a sophisticated Bayesian processing methodology, a similarity analysis employing dot product and/or cosine function processing and decision tree processing. The first measure may also be based, for example, on previous knowledge, where such previous knowledge may be general in nature. For example, the previous knowledge may concern data including, but not limited to, header structure, indicia of junk mail (e.g., percentage non-alphanumeric characters, capitalization patterns), relationships in an organization chart, length of messages, times, dates and other linguistic features like tense usage, presence and number of questions.

At 540 a second measure associated with the message of 520 is produced. The second measure may be produced by techniques including, but not limited to, support vector methodology, a naïve Bayesian processing methodology, a sophisticated Bayesian processing methodology, a similarity analysis employing dot product and/or cosine function processing and decision tree processing. The second measure may also be based, for example, on subsequent knowledge, where such subsequent knowledge may be specific in nature. For example, the subsequent knowledge may concern data including, but not limited to detailed phrases and/or single words. The measures may be associated with properties including, but not limited to, the probability that a message has a certain classification, the priority of a message, the urgency of a message and the computed expected urgency of a message, for example.

At 550 the measures of 530 and 540 may be combined to produce a combined measure. The combination may be affected by weights associated with each of the measures. By way of illustration, if a higher confidence exists for the measure of 530, then a higher weight may be associated with that measure while a lower weight may be associated with the measure of 540. But if a very high confidence exists for the measure of 540, then the weights may be adjusted so that substantially all of the measure of 550 is determined: by the measure of 540 and substantially none of the measure of 550 is determined by the measure of 530. The measures being combined may be, for example, measures produced by a default filter and a personalized filter. Thus, the weights assigned to the measures may be employed to choose between the default filter and the personalized filter, for example.

At 560, the message of 520, and/or information associated with message (e.g., time received, length of message, sender, probabilities) (hereinafter "message data") may be stored. At 570, one or more stored messages, and/or message data associated with the stored messages may be updated to reflect changes in the relevance of such stored messages and/or message data. By way of simple illustration, older messages and/or message data may be updated to reduce their relevance, while newer data may be updated to increase their relevance. Similarly, messages and/or message data associated with messages that increase the coverage of training data may be updated to increase their relevance while repetitive messages and/or message data may be updated to decrease their relevance.

At 580, the system(s) and/or method(s) that were employed in 540 to produce the second measure are adapted. Such adaptation functions to personalize the information classification associated with producing the second measure. The update may be based, for example, on the relationship between the measure of 530 and the measure of 540. The update may also be based, for example, on a relationship between the measure 540 and explicit classification instructions provided by a user during supervised learning, for example.

At 590 a determination is made concerning whether another message is to be processed. If the determination is no, then processing concludes, otherwise processing returns to 520.

Turning now to FIG. 6, a flow chart illustrates another methodology 600 employed in personalizing an information classifier. At 610, general initializations occur. Such initializations can include, but are not limited to, allocating memory, establishing pointers, establishing data communications, acquiring resources, setting variables and displaying process activity. At 620, information concerning the progress of personalization of an information classifier is provided. For example, a graph illustrating the degree to which the information classifier has been personalized may be displayed. The information concerning the progress of personalization may include information concerning a variable K, which is associated with the adequacy of the adapting data employed in personalizing the information classifier. For example, the variable K may be related to the size of an adapting data set and/or the coverage achieved by an adapting data set.

At 630, a determination is made concerning whether the personalizer of the information classifier desires to adjust K. If the determination at 630 is YES, then at 640 K can be adjusted. For example, data may be displayed concerning the current status of K and the effects of adjusting K, and a new value for K may be input. If the determination at 630 is NO, then processing proceeds to 650. At 650, a determination is made concerning whether changes to time phases associated with the personalization of the information classifier are desired. For example, a user may determine that personalization achieved during a first period of time is to be de-emphasized while personalization achieved during a second period of time is to be emphasized. If the determination at 650 is YES, then at 660 processing to adjust the time phases occurs. For example, the user may specify that personalization achieved during a first period of time is to be de-emphasized while personalization achieved during a second period of time is to be emphasized. If the determination at 650 is NO, then processing proceeds to 670.

At 670 a determination is made concerning whether an information personalizer desires to force retraining of an information classifier. While this application employs the terms "user" and "information personalizer", it is to be appreciated that such users and information personalizers may be human, mechanical, electronic and/or computer based entities. If the determination at 670 is YES, then at 680, processing associated with forcing retraining may be commenced. For example, K may be adjusted, one or more data stores, data structures, processes, threads, algorithms and/or rules may be reset to previous states and one or more messages and/or message data may be deleted. Such deletion may be physical (e.g., resetting bits) or logical (e.g., setting a flag, adjusting a weight).

At 690 a determination is made concerning whether the current information classifier modification session is completed. If the determination is YES, processing concludes, otherwise, processing returns to 620 where another iteration can begin.

Figure 7:
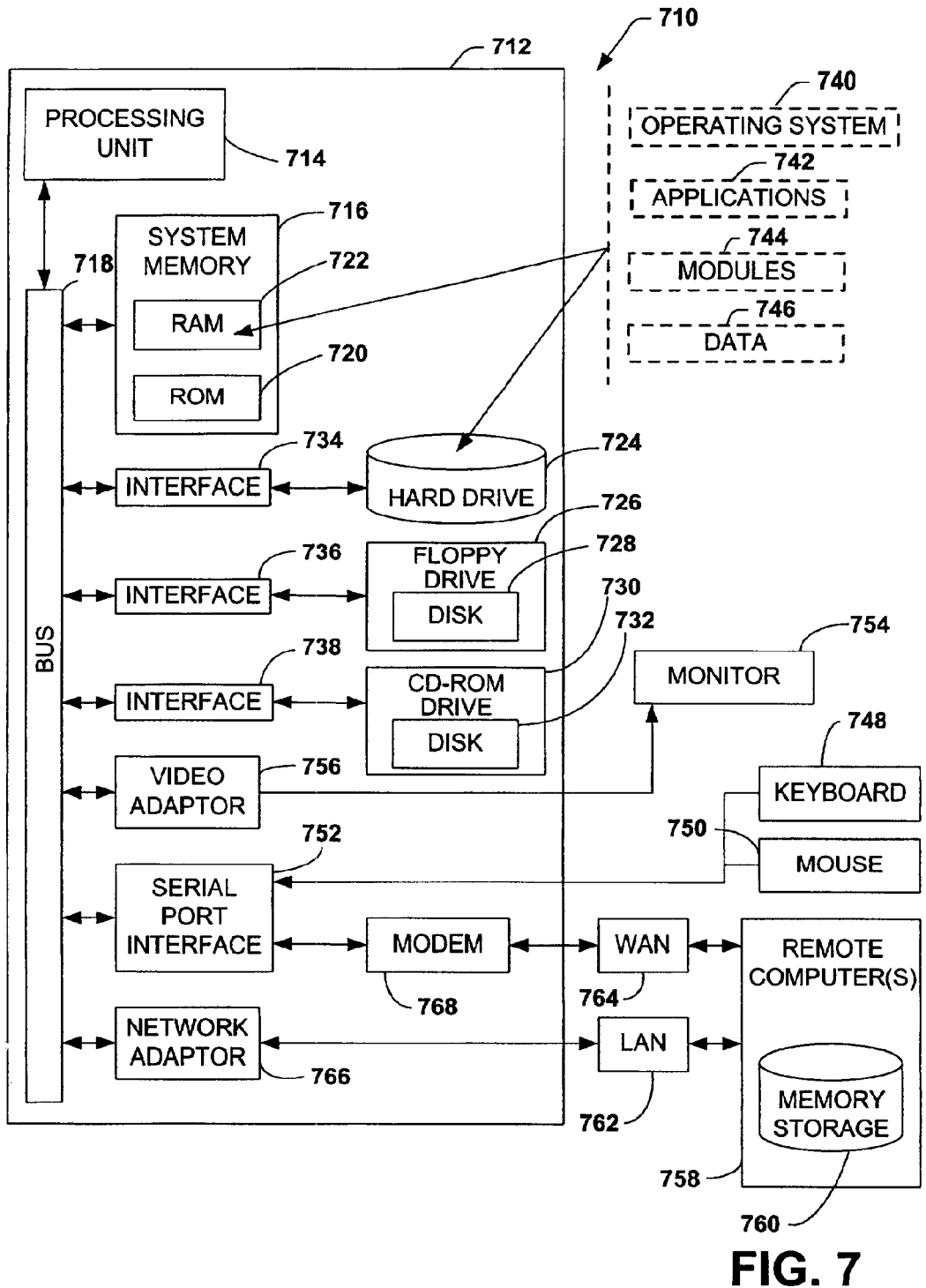
FIG. 7 is a schematic block diagram of an exemplary operating environment for a system configured in accordance with the present invention.

In order to provide additional context for various aspects of the present invention, FIG. 7 and the following discussion are intended to provide a brief, general description of a suitable computing environment 710 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 7, an exemplary environment 710 for implementing various aspects of the invention includes a computer 712, the computer 712 including a processing unit 714, a system memory 716 and a system bus 718. The system bus 718 couples system components including, but not limited to the system memory 716 to the processing unit 714. The processing unit 714 may be any of various commercially available processors. Dual microprocessors and other multi-processor architectures also can be employed as the processing unit 714.

The system bus 718 can be any of several types of bus structure including a memory bus or memory controller, a peripheral bus and a local bus using any of a variety of commercially available bus architectures. The system memory 722 includes read only memory (ROM) 720 and random access memory (RAM) 722. A basic input/output system (BIOS), containing the basic routines that help to transfer information between elements within the computer 712, such as during start-up, is stored in ROM 720.

The computer 712 further includes a hard disk drive 724, a magnetic disk drive 726, (e.g., to read from or write to a removable disk 728) and an optical disk drive 730, (e.g., for reading a CD-ROM disk 732 or to read from or write to other optical media). The hard disk drive 724, magnetic disk drive 726 and optical disk drive 730 can be connected to the system bus 718 by a hard disk drive interface 734, a magnetic disk drive interface 736 and an optical drive interface 738, respectively. The drives and their associated computer-readable media provide nonvolatile storage of data, data structures, computer-executable instructions, etc. for the computer 712, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 722, including an operating system 740, one or more application programs 742, other program modules 744 and program data 746. It is to be appreciated that the present invention can be implemented with various commercially available operating systems or combinations of operating systems.

A user can enter commands and information into the computer 712 through a keyboard 748 and a pointing device, such as a mouse 750. Other input devices (not shown) may include a microphone, an IR remote control, a joystick, a game pad, a satellite dish, a scanner, or the like. These and other input devices are often connected to the processing unit 714 through a serial port interface 752 that is coupled to the system bus 718, but may be connected by other interfaces, such as a parallel port, a game port, a universal serial bus ("USB"), an IR interface, etc. A monitor 754 or other type of display device is also connected to the system bus 718 via an interface, such as a video adapter 756. In addition to the monitor, a computer typically includes other peripheral output devices (not shown), such as speakers, printers etc.

The computer 712 may operate in a networked environment using logical connections to one or more remote computers, such as a remote computer(s) 758. The remote computer(s) 758 may be a workstation, a server computer, a router, a personal computer, microprocessor based entertainment appliance, a peer device or other common network node, and typically includes many or all of the elements described relative to the computer 712, although, for purposes of brevity, only a memory storage device 760 is illustrated. The logical connections depicted include a local area network (LAN) 762 and a wide area network (WAN) 764. Such networking environments are commonplace in offices, enterprise-wide computer networks, intranets and the Internet.

When used in a LAN networking environment, the computer 712 is connected to the local network 762 through a network interface or adapter 766. When used in a WAN networking environment, the computer 712 typically includes a modem 768, or is connected to a communications server on the LAN, or has other means for establishing communications over the WAN 764, such as the Internet. The modem 768, which may be internal or external, is connected to the system bus 718 via the serial port interface 752. In a networked environment, program modules depicted relative to the computer 712, or portions thereof, may be stored in the remote memory storage device 760. It will be appreciated that the network connections shown are exemplary and other means of establishing a communications link between the computers may be used.

What has been described above includes examples of the present invention. It is of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

What is claimed is:

1. A system for personalizing an information classifier, comprising:
   a first classifier, pre-trained with training data, that produces a first measure associated with a message classification;
   a second classifier, trained with adapting data, that produces a second measure associated with the message classification;
   a combining component that combines the first measure and the second measure to produce a third measure associated with message classification; and
   a user interface that accepts information concerning personalizing the second classifier, the information comprises information related to at least one of an amount of the adapting data required before a confidence level is associated with the personalized classifier and the coverage of adapting data required before a confidence level is associated with the personalized classifier.

2. The system of claim 1, further comprising:
   a weighting component that assigns a first weight to the first measure and a second weight to the second measure; and
   the combining component further combines the first measure and the second measure to produce the third measure associated with the message classification, based, at least in part, on the first measure, the second measure, the first weight and the second weight.

3. The system of claim 1, further comprising:
   an aging component that modifies a relevance of one or more messages based, at least in part, on time-based information associated with a message; and
   an adapting component that modifies the second classifier.

4. The system of claim 1, the user interface displays information concerning the personalization of the second classifier.

5. The system of claim 4, the information concerning the personalization of the second classifier is displayed as a graph.

6. The system of claim 1, the information concerning personalizing the second classifier further comprises information related to a time period associated with a subset of adapting data, for which the relevance of adapting data is altered.

7. The system of claim 6, the information concerning retaining the second classifier further comprising information related to a point in time back to which modifications to the second classifier are to be rescinded.

8. The system of claim 1, the first classifier and the second classifier are implemented in one component.

9. The system of claim 1, the first classifier and the second classifier are implemented in separate components.

10. The system of claim 1, the training data employed in training the first classifier includes at least one of a header structure, an indicia of junk mail, a percentage of non-alphanumeric characters, capitalization patterns, relationships in an organization chart, length of messages, times of messages, dates of messages, tense usage, presence of questions and number of questions.

11. The system of claim 1, the adapting data includes at least one of an explicit data set and an observation data set.

12. The system of claim 11, the explicit data set comprises one or more pre-determined messages to be classified by a user of the system, the user classification of the pre-determined messages are employed in adapting the second classifier.

13. The system of claim 11, the observation data set comprises at least one message received by a user of the system.

14. The system of claim 13, the observation data set further comprising action data associated with the at least one message received by a user of the system.

15. The system of claim 1, the first classifier employs at least one of a support vector methodology, a naïve Bayesian processing methodology, a sophisticated Bayesian processing methodology, a similarity analysis employing dot product and/or cosine function processing and decision tree processing to produce the first measure.

16. The system of claim 1, the second classifier employs at least one of a support vector methodology, a naïve Bayesian processing methodology, a sophisticated Bayesian processing methodology, a similarity analysis employing dot product and/or cosine function processing and decision tree processing to produce the second measure.

17. The system of claim 1, the first measure is associated with at least one of a probability that the message has a known classification type, a priority of the message and an urgency score of the message.

18. The system of claim 1, where the second measure is associated with at least one of a probability that a message has a known classification type, a priority of a message and an urgency score of a message.

19. The system of claim 1, the third measure is associated with at least one of a probability that a message has a known classification type, a priority of a message and an urgency score of a message.

20. The system of claim 2, the third measure is computed using the formula $F=m1(1-w)+m2(w)$, m1 is the first measure, m2 is the second measure, w is the weight assigned to the second measure and (1-w) is the weight assigned to the first measure.

21. The system of claim 20, the third measure is normalized to a range associated with a range of the first measure and the second measure.

22. The system of claim 1, the third measure is employed to determine how an email message should be routed.

23. The system of claim 1, the third measure is employed to determine at least one of, when an email message should be routed, when an email message should be sent to a cell phone, when an email message should be archived, when an email message should be encrypted and when an email message should be deleted.

24. The system of claim 2, the weighting component determines at least one of the first weight and the second weight based, at least in part, on the amount of adapting data that has been employed in personalizing the second classifier.

25. The system of claim 2, the weighting component determines at least one of the first weight and the second weight based, at least in part, on the coverage of the adapting data that has been employed in personalizing the second classifier.

26. The system of claim 2, the combining component produces the third measure by applying the first weight to the first measurement to produce a first weighted measure and applying the second weight to the second measure to produce a second weighted measure and by combining the first weighted measure and the second weighted measure.

27. The system of claim 3, the aging component modifies the relevance of one or more messages by manipulating at least one of, a weight associated with a message and a weight associated with one or more pieces of message data.

28. The system of claim 1, further comprising a first data store that stores at least one of, one or more messages employed in training the first classifying component and one or more pieces of message data employed in training the first classifying component.

29. The system of claim 28, further comprising a second data store that stores at least one of, one or more messages employed in personalizing the second classifier and one or more pieces of message data employed in personalizing the second classifier.

30. The system of claim 28, the aging component modifies the relevance of one or more messages by removing at least one of, the one or more messages and the one or more pieces of message data from the first data store.

31. The system of claim 29, the aging component modifies the relevance of one or more messages by removing at least one of, the one or more messages from the second data store and one or more pieces of message data from the second data store.

32. The system of claim 3, the adapting component modifies the second classifier by adjusting at least one of, one or more data stores, one or more data structures, one or more algorithms and one or more rules associated with the second classifier.

33. The system of claim 32, the adapting component modifies the second classifier based, at least in part, one a relationship between the first measure and the second measure.

34. A data packet adapted to be transmitted between two or more computer processes comprising:
   information related to personalizing an information classifier, the information comprising at least one of weighting data, aging and adapting data, the information corresponds to at least one of an amount of adapting data that yields a confidence level associated with a classifier that is personalized and a coverage of adapting data that results in a confidence level associated with a classifier that is personalized.

35. A computer readable medium containing computer executable components of a system for personalizing an information classifier, comprising:
   a first classifying component, pre-trained with training data, operable to produce a first measure associated with a message classification;
   a second classifying component, trained with adapting data, operable to produce a second measure associated with the message classification;
   a weighting component adapted to assign a first weight to the first measure and a second weight to the second measure;
   a combining component adapted to combine the first measure and the second measure to produce a third measure associated with the message classification, the combining component basing the combination, at least in part, on the first measure, the second measure, the first weight and the second weight;
   an aging component adapted to modify the relevance of one or more messages based and/or one or more pieces of message data, at least in part, on time-based information associated with a message;
   an adapting component operable to modify the second classifier; and
   a user interface that accepts information concerning personalizing the second classifier, the information comprises information related to at least one of an amount of the adapting data required before a confidence level is associated with the personalized classifier and the coverage of adapting data required before a confidence level is associated with the personalized classifier.

36. A method for personalizing an information classifying process, comprising:

receiving a message to be classified;

producing a first measure that the message is classified as having one of N characteristics, N being an integer;

producing a second measure that the message is classified as having one of N characteristics, N being an integer;

combining the first measure with the second measure to produce a third measure that the message is classified as having one of N characteristics, N being an integer, where the combining depends, at least in part, on a first weight associated with the first measure and a second weight associated with the second measure;

updating at least one of a data store, a data structure, an algorithm, a process, a thread and a rule employed in generating the second measure, based, at least in part, on a relationship between the first measure and the second measure; and accepting information associated with personalizing the information classifying process, the information comprises information related to at least one of an amount of adapting data required before a confidence level is associated with the personalization and a coverage of adapting data required before a confidence level is associated with the personalization.

37. The method of claim 36, comprising displaying information associated with personalizing the information classifying process.

38. The method of claim 37, where displaying information associated with personalizing the information classifying process includes displaying at least one of a measure associated with the degree of personalization associated with generating the second measure and one or more time periods over which the personalizing has occurred.

39. The method of claim 36, where the information associated with personalizing the information process includes at least one of a size associated with an adapting data set employed in personalizing the classifying process, one or more time periods for which the weights assigned to personalization applied to the process employed in generating the second measure is to be manipulated and a point in time to which the process for generating the second measure should be reset.

40. The method of claim 36, further comprising:

storing at least one of one or more classified messages and one or more message data points; and manipulating the relevance of at least one of the one or more classified messages and the one or more message data points as related to determining at least one of the first and second probabilities based, at least in part, on temporal data associated with the one or more stored classified messages and one or more message data points.

41. The method of claim 40, manipulating the relevance of at least one of the one or more classified messages and one or more message data points includes deleting at least one of the one or more classified messages and the one or more message data points.

42. The method of claim 40, manipulating the relevance of at least one of the one or more classified messages and one or more message data points involves changing one or more weights associated with at least one of the one or more classified messages and the one or more message data points.

43. The method of claim 36, the N characteristic comprise at least one of the probability that a message is of a known type, a message priority, an urgency score and a computed expected urgency.

44. A method for personalizing information classifying process, comprising:

producing a measure associated with a message classification; and updating at least one of a data store, a data structure, an algorithm, a process, a thread and a rule employed in generating the measure, based, at least in part, on a relationship between the measure and a user input provided during supervised learning, updating utilizes information concerning personalizing a classifier related to at least one of an amount of the adapting data required before a confidence level is associated with the personalized classifier and the coverage of adapting data required before a confidence level is associated with the personalized classifier.

45. A system for personalizing an information classifier, comprising:

means for producing a first measure associated with a message classification, the first measure being associated with at least one of a probability that the message has a known classification type, a priority of the message and an urgency score of the message;

means for producing a second measure associated with the message classification, the second measure being associated with at least one of the probability that the message has a known classification type, the priority of the message and the urgency score of the message;

means for combining the first measure and the second measure to produce a third measure associated with the message classification, the third measure being produced using the formula $F=m1(1-w)+m2(w)$, m1 is the first measure, m2 is the second measure, w is the weight assigned to the second measure and $(1-w)$ is the weight assigned to the first measure; and means for accepting information concerning personalization, the information comprises information related to at least one of an amount of the adapting data required before a confidence level is associated with the personalization and the coverage of adapting data required before a confidence level is associated with the personalization.

* * * * *